(12) United States Patent
Yamada et al.

(10) Patent No.: US 10,803,165 B2
(45) Date of Patent: Oct. 13, 2020

(54) DETECTION OF SHELLCODE

(71) Applicant: McAfee, LLC, San Jose, CA (US)

(72) Inventors: Koichi Yamada, Los Gatos, CA (US);
Palanivel Rajan Shanmugavelayutham, San Jose, CA (US); Greg W. Dalcher, Tigard, OR (US); Sravani Konda, San Jose, CA (US)

(73) Assignee: McAfee, LLC, San Jose, CA (US)

( * ) Notice: Subject to any disclaimer, the term of this patent is extended or adjusted under 35 U.S.C. 154(b) by 160 days.

(21) Appl. No.: 14/866,860

(22) Filed: Sep. 26, 2015

(65) Prior Publication Data
US 2016/0381043 A1    Dec. 29, 2016

Related U.S. Application Data

(60) Provisional application No. 62/185,604, filed on Jun. 27, 2015.

(51) Int. Cl.
| | | |
|---|---|---|
| *G06F 7/04* | (2006.01) | |
| *G06F 21/52* | (2013.01) | |
| *H04L 29/06* | (2006.01) | |
| *G06F 21/55* | (2013.01) | |

(52) U.S. Cl.
CPC ............ *G06F 21/52* (2013.01); *G06F 21/554* (2013.01); *H04L 63/1425* (2013.01)

(58) Field of Classification Search
CPC ...... G06F 21/14; G06F 21/125; G06F 21/554; G06F 2221/033; G06F 12/10; G06F 21/55; G06F 21/577; G06F 2221/034; G06F 21/566; G06F 11/3612; G06F 21/56; G06F 11/3003; G06F 2201/865; H04L 63/14; H04L 63/1408; H04L 63/145; H04L 63/1433
See application file for complete search history.

(56) References Cited

U.S. PATENT DOCUMENTS

| | | | |
|---|---|---|---|
| 5,313,616 A * | 5/1994 | Cline | .......... G06F 11/3612 |
| | | | 713/323 |
| 5,987,610 A | 11/1999 | Franczek et al. | |
| 6,073,142 A | 6/2000 | Geiger et al. | |
| 6,460,050 B1 | 10/2002 | Pace et al. | |
| 7,506,155 B1 | 3/2009 | Stewart et al. | |
| 8,515,075 B1 * | 8/2013 | Saraf | ............ G06F 21/566 |
| | | | 380/277 |

(Continued)

FOREIGN PATENT DOCUMENTS

| | | | | |
|---|---|---|---|---|
| JP | 2009528632 A | 8/2009 | | |
| WO | WO-2012154664 A2 * | 11/2012 | ........ | G06F 21/53 |

OTHER PUBLICATIONS

Zhang et al. Analyzing Network Traffic to Detect Self-Decrypting Exploit Code, ACM Symposium, Mar. 20, 2007, pp. 4-12.*

(Continued)

*Primary Examiner* — Farid Homayounmehr
*Assistant Examiner* — Lizbeth Torres-Diaz
(74) *Attorney, Agent, or Firm* — Patent Capital Group

(57) ABSTRACT

Particular embodiments described herein provide for an electronic device that can be configured to monitor code as it executes. The code can include self-modifying code. The system can log an event if the self-modifying code occurred in a GetPC address region.

20 Claims, 11 Drawing Sheets

(56) References Cited

U.S. PATENT DOCUMENTS

| | | | | |
|---|---|---|---|---|
| 8,639,828 B1* | 1/2014 | Frazier | ............... | H04L 43/0811 |
| | | | | 709/230 |
| 8,856,789 B2* | 10/2014 | Torrey | ............... | G06F 9/45558 |
| | | | | 718/1 |
| 2007/0094496 A1* | 4/2007 | Burtscher | ............ | G06F 21/561 |
| | | | | 713/164 |
| 2007/0234330 A1* | 10/2007 | Field | ....................... | G06F 21/57 |
| | | | | 717/165 |
| 2012/0255012 A1 | 10/2012 | Sallam | | |
| 2014/0123280 A1* | 5/2014 | Kedma | .................. | G06F 21/56 |
| | | | | 726/23 |
| 2014/0181976 A1* | 6/2014 | Snow | .................... | G06F 21/566 |
| | | | | 726/23 |
| 2015/0020198 A1 | 1/2015 | Mirski et al. | | |
| 2015/0278491 A1* | 10/2015 | Horning | ................. | G06F 21/14 |
| | | | | 726/26 |
| 2016/0112441 A1* | 4/2016 | Bae | .................... | H04L 63/1408 |
| | | | | 726/23 |
| 2016/0283716 A1* | 9/2016 | Momot | .............. | G06F 9/45558 |

OTHER PUBLICATIONS

International Search Report and Written Opinion in International Application No. PCT/US2016/034267, dated Aug. 24, 2016, 11 pages.

Fujii, Takayoshi, et al., "Improvement of Emulation-based Shellcode Detection," Computer Security Symposium (CSS2010), Oct. 19-21, 2010, Okayama, Japan; 6 pages [English Abstract].

* cited by examiner

DETECTION OF SHELLCODE

CROSS-REFERENCE TO RELATED APPLICATION

This application claims the benefit of priority under 35 U.S.C. § 119(e) to U.S. Provisional Application No. 62/185,604, entitled "DETECTION OF SHELLCODE" filed in the U.S. Patent Office on Jun. 27, 2015, which is hereby incorporated by reference in its entirety.

TECHNICAL FIELD

This disclosure relates in general to the field of information security, and more particularly, to the detection of shellcode to identify malware.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators to gain unauthorized access to computers and computer networks and for intentional or inadvertent disclosure of sensitive information.

Malicious software ("malware") that infects a host computer may be able to perform any number of malicious actions, such as stealing sensitive information from a business or individual associated with the host computer, propagating to other host computers, and/or assisting with distributed denial of service attacks, sending out spam or malicious emails from the host computer, etc. Hence, significant administrative challenges remain for protecting computers and computer networks from malicious and inadvertent exploitation by malicious software and devices.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EXAMPLE EMBODIMENTS

Example Embodiments

Figure 1:
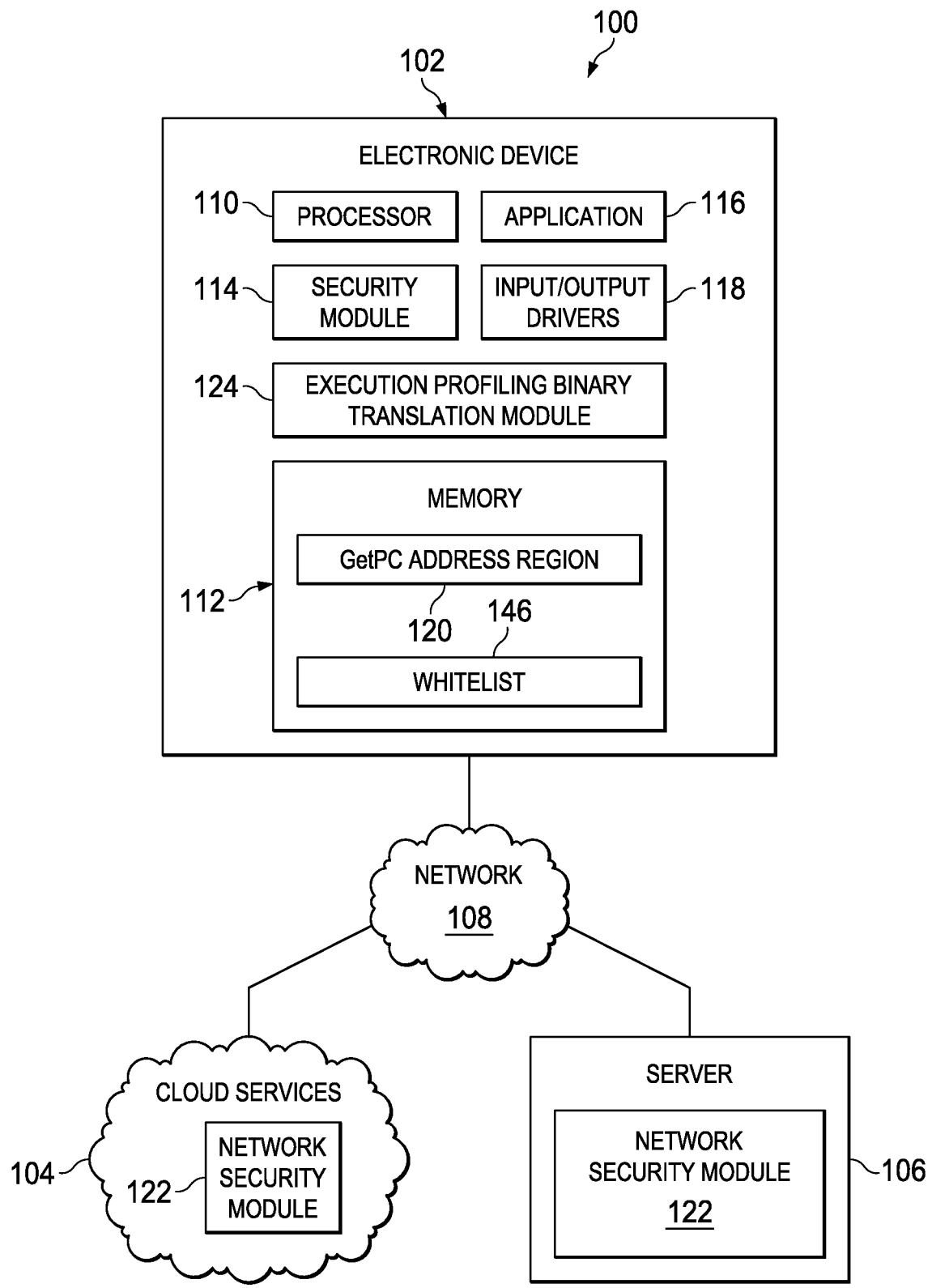
FIG. 1 is a simplified block diagram of a communication system for the detection of shellcode, in accordance with an embodiment of the present disclosure.

FIG. 1 is a simplified block diagram of a communication system 100 for the detection of shellcode, in accordance with an embodiment of the present disclosure. As illustrated in FIG. 1, communication system 100 can include electronic device 102, cloud services 104, and a server 106. Electronic device 102 can include a processor 110, memory 112, a security module 114, an application 116, input/output drivers 118, and execution profiling binary translation module 124. Memory 112 can include GetPC address region 120 and whitelist 146. Cloud services 104 and server 106 can each include a network security module 122. Electronic device 102, cloud services 104, server 106 may be in communication using network 108.

In example embodiments, communication system 100 can be configured for detecting shellcode in accordance with an embodiment of the present disclosure. Elements of FIG. 1 may be coupled to one another through one or more interfaces employing any suitable connections (wired or wireless), which provide viable pathways for network (e.g., network 108, etc.) communications. Additionally, any one or more of these elements of FIG. 1 may be combined or removed from the architecture based on particular configuration needs. Communication system 100 may include a configuration capable of transmission control protocol/Internet protocol (TCP/IP) communications for the transmission or reception of packets in a network. Communication system 100 may also operate in conjunction with a user datagram protocol/IP (UDP/IP) or any other suitable protocol where appropriate and based on particular needs.

For purposes of illustrating certain example techniques of communication system 100, it is important to understand the communications that may be traversing the network environment. The following foundational information may be viewed as a basis from which the present disclosure may be properly explained.

Currently, return oriented programming (ROP) exploit attacks, which use existing application or library code for conducting an attack, have become prevalent to bypass disable execution permission (DEP) mitigation. Many ROP exploits involve subsequent execution of shellcode (e.g., a machine-code payload) for conducting and completing attacks. Such shellcode also employs code obfuscation, which is known to be effective to bypass the signature based antivirus detection techniques.

Malware often employs obfuscation techniques such as proprietary methods of compression, encryptions, etc. to hide itself from antivirus scanners. Such obfuscated code is found in many of malware executable and malware payload carried by exploits. The obfuscation techniques are known to be effective in bypassing signature based antivirus detection techniques.

Unfortunately, most current countermeasures for such obfuscated malware code are severely limited as signature based methods typically are not able to detect the obfuscated malware. What is needed is a dynamic runtime detection of obfuscated malware code. It would be beneficial if a system and method could detect the self-decrypting code sequence and allow antivirus software to dynamically apply signature based methods and spot malware after the decryption of the obfuscated malware code.

A communication system for the detection of shellcode, as outlined in FIG. 1, can resolve these issues (and others). Communication system 100 can be configured to allow for runtime detection of obfuscated malware code, to detect the self-decrypting code sequence, allow antivirus software to dynamically apply signature based methods, and identify malware after the decryption of the obfuscated malware code. Obfuscated malware or shellcode is typically encrypted and needs to be self-decrypted prior to the execution. This self-decrypting process of the malware code begins with a GetPC or GetEIP operation, which is used to locate the address of the obfuscated malware code body. Once the address of the obfuscated code is known with the GetPC operation, the malware performs unpacking (decompression) and self-decrypting (decoding) operations from the discovered GetPC address. The process can involve self-modifying code operations modifying a number of bytes in its code prior to the malware code execution.

Typically, the self-decryption process includes GetPC code execution, the consumption of the GetPC address, and the actual decrypting (decoding) operations against the obfuscated malware code memory. Communication system 100 can use binary translation techniques to identify the instruction sequence(s) commonly used for GetPC operation by malware, seed a poisoned address to detect the consumption of the GetPC address, and use a self-modifying code (SMC) detection mechanism of the binary translation system to detect the actual decrypting (decoding) operations. The term "poison" is used to modify an address or area to trigger some action such as an exception, fault, event, alert, etc. when the poisoned address or area is accessed. Note that more than one method may be used to seed a poisoned address. False positive determinations may be avoided by involving binary translation techniques such as forward code flow analysis to determine whether a GetPC address is in the instruction region or non-instruction region and tracking and association of the decryption process events. Further, false positive events may be avoided by applying signature based scanning methods to de-obfuscated malware code after the decryption process to make an final determination of the malware code. In addition, a self-discovery GetPC code sequence used by malware is also highly unusual.

Communication system 100 can also be configured to use binary translator's look-ahead code flow analysis to decode and analyze the code region that contains the GetPC operation and distinguish whether the GetPC address is located in the code region or non-code region. Communication system 100 can track these sequences of the events and wait until the third event occurs to make a final detection decision and minimize false positives of the decryption process discovery. Communication system 100 can also allow security module 114 or network security module 122 to dynamically apply signature based methods after the detection of the decryption of the obfuscated malware code.

Many current runtime malware detection solutions and signature based detection methods are unable to detect malware's obfuscation techniques and code obfuscation. Detection of obfuscated malware code is difficult because the code must be de-obfuscation and often requires malware experts to conduct an exhaustive manual analysis, spending many hours, days and often taking months to analyze the malware. Periodic scan of process memory is costly and severely impacts performance of a system. Such severe limitations of today's solutions can prevent or hinder antivirus vendors from developing and deploying effective automated malware analysis solutions and deploying endpoint security for detecting such obfuscated malware and malware payload.

Communication system 100 can be configured to provide a runtime detection mechanism of obfuscated malware code and malware payload and spot the decryption process of obfuscated malware code using binary translation techniques. Communication system 100 can also complement and improve existing signature based methods that can perform code scanning after the self-decryption of obfuscated malware code.

Communication system 100 can provide a dynamic runtime detection mechanism for obfuscated malware code or obfuscated payload (e.g., shellcode) by detecting the decryption process of the malware code. The decryption process of the malware code can involve the execution of a GetPC instruction sequence, the consumption of the discovered GetPC address, and self-modifying operations of the code region started from the discovered PC address. Execution profiling binary translation module 124 can include binary analysis, translator, and runtime functions or modules. A binary analysis module (e.g., translator 128 illustrated in FIG. 2) can be configured to perform binary analysis and identifying the GetPC instruction sequence. The translator module (e.g., translator 128) can be configured to generate a translated version of the original application binary in order to instrument the GetPC code sequence for enabling tracking and callback to security module. The runtime module (e.g., runtime 130 illustrated in FIG. 2) can be configured for the management of the translations including translation installations, deletions and garbage collections. A security module (e.g., security module 114 or network security module 122) can be configured for interacting with the operating system and conducting emulation and virtualization of the OS system calls.

There are a number of ways in instruction sequence to implement self-discovery of a current PC address in x86 ISA. However, it is possible for BT modules to identify the GetPC code sequence used by malware code with minimal false positives. One example includes using a translator's look-ahead code flow analysis to decode and analyze the code region that contains the GetPC operation and distinguish whether the GetPC address is located in the actual code region or non-code region.

For example, CALL 0 followed by POP is a relatively simple way to acquire the current PC in x86 code and even some legitimate runtime code may use this code sequence. This code sequence, however, contains null bytes. As a null byte injection is typically monitored and detectable by host intrusion applications, malware often uses the FSTENV instruction followed by POP instruction to implement self-discovery of the current GetPC address. The other GetPC instruction sequence that is commonly used by malware includes a CALL instruction with a call target address pointing to the middle of the CALL instruction itself. There are other code sequences used by malware's shellcode but the binary analysis can be configured to recognize the other patterns and identify such suspicious instruction and code sequence that implement self-discovery of the current IP address. For example, when the code is identified as a GetPC operation, communication system 100 can be configured to perform an analyses to confirm if it is a suspicious GetPC operation to track and minimize false positives. The analysis can include determining if the code is in writeable (heap, stack, etc.) memory (includes executable and writeable), determine if the code backed by an executable module such as a DLL, determine if the code is backed by an executable module and is the module trusted (e.g., signed by trusted source, vetted through other means), etc.

Once the GetPC instruction sequence is discovered, a translator can generate a translation version of the original binary with necessary instrumentations. In a translated version, the GetPC instruction sequence is instrumented to log a GetPC execution event with GetPC address, give notification (as the GetPC event) to security module 114 for deeper analysis, and seed a poison GetPC address by replacing the GetPC address with an identifiable invalid address. Using the GetPC event as a trigger to security module 114 enables deeper analysis of the code involved such as through scanning for known malware patterns, identifying instructions and sequences used, etc.

Seeding a uniquely identifiable poisoned GetPC address allows execution profiling binary translation module 124 to detect the exact consumption point of the GetPC address by the malware code. The poison GetPC address can be any invalid address, but the address value needs to be uniquely identifiable by execution profiling binary translation module 124. The detection of the GetPC address consumption can be done by intercepting an access violation exception caused by the shellcode through a system layer module of execution profiling binary translation module 124, which intercepts the exception dispatch calls from the OS and virtualizes the OS interactions of an application. The distinction between the true access violation and the consumption of the GetPC address by the malware's decryption process can be made by checking the faulting memory address to find if it matches with the unique poison GetPC address. Optionally, execution profiling binary translation module 124 can be configured to write-protect the GetPC address region (page) to detect the consumption of the GetPC address when the malware performs self-modifying operation of the encrypted malware code body, instead of seeding a poison GetPC address to the shellcode's unpacking code.

At a final stage of the decryption process, malware's self-modifying operation on the GetPC memory region is detected by using the binary translation system's self-modifying code detection mechanism, which is either implemented through a generation of self-checking translation that performs self-checks during the translation execution to see if the code is still the same as the bytes at the time of translation or write-protecting the original code page with help from a system layer module of execution profiling binary translation module 124. The distinction between the static memory controller (SMC) caused by the malware's decryption process and the other type of SMCs can be made by checking the SMC memory address to know If SMC occurs in the GetPC address region.

The above detection mechanisms provided by execution profiling binary translation module 124, allows security module 114 to monitor and precisely track a sequence of the events associated with malware's decryption process. Security module 114 may use each individual event for analyzing and determining the presence of the malware execution, or use all three events, track and associate these events to determine if this is the true decryption process or false positives Execution profiling binary translation module 124 can also be configured to notify security module 114 prior to the execution of the self-modified code execution. This can be done by execution profiling binary translation module 124 to add a notification mechanism before executing SMC translations. SMC translations are the translations created by execution profiling binary translation module 124 as a result of SMC events or operations. This allows security module 114 to dynamically apply signature based scanning methods to de-obfuscated malware code for finding the known malware signatures. This final step helps security module 114 to determine whether the discovered decryption process is legitimate or malicious.

During de-obfuscation, the malware first needs to read the original code. This can be detected with faulting on a poisoned address. When security module 114 determines the last stage of the malware executing (de-obfuscation of the original code) needs to be observed, security module 114 can replace the poisoned address with the original GetPC address. The last stage can be detected by SMC detection mechanism provided by the BT module. After SMC (e.g., de-obfuscation) executes, security module 114 can inspect the de-obfuscated code to determine if the code is malicious.

Poisoning is a way to intercept a load operation using the GetPC address. In an example, each GetPC address can be replaced with a unique reserved invalid address. When a load occurs with the poisoned address, a fault will be generated and execution profiling binary translation module 124 can inspect the fault and determine whether the fault address matches with any of the poisoned addresses previously generated. In an example, when a unique GetPC operation occurs, the system can replace the GetPC address with a unique poisoned address. For example, two GetPC operations occur on two different IP locations, two different poison addresses can be assigned for each of GetPC addresses. Execution profiling binary translation module 124 can know what GetPC address corresponds to the poisoned address upon the fault (e.g., consumption time on a load operation).

Turning to the infrastructure of FIG. 1, communication system 100 in accordance with an example embodiment is shown. Generally, communication system 100 can be implemented in any type or topology of networks. Network 108 represents a series of points or nodes of interconnected communication paths for receiving and transmitting packets of information that propagate through communication system 100. Network 108 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in communication system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, electronic device 102, cloud services 104, and server 106 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, each of electronic device 102, cloud services 104, and server 106 can include memory elements for storing information to be used in the operations outlined herein. Each of electronic device 102, cloud services 104, and server 106 may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as electronic device 102, cloud services 104, and server 106 may include software modules (e.g., security module 114, network security module 122, and execution profiling binary translation module 124) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of electronic device 102, cloud services 104, and server 106 may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Electronic device 102 can be a network element and includes, for example, desktop computers, laptop computers, mobile devices, personal digital assistants, smartphones, tablets, or other similar devices. Cloud services 104 is configured to provide cloud services to electronic device 102. Cloud services 104 may generally be defined as the use of computing resources that are delivered as a service over a network, such as the Internet. Typically, compute, storage, and network resources are offered in a cloud infrastructure, effectively shifting the workload from a local network to the cloud network. Server 106 can be a network element such as a server or virtual server and can be associated with clients, customers, endpoints, or end users wishing to initiate a communication in communication system 100 via some network (e.g., network 108). The term 'server' is inclusive of devices used to serve the requests of clients and/or perform some computational task on behalf of clients within communication system 100. Although security module 114 is represented in FIG. 1 as being located in electronic devices 102, this is for illustrative purposes only. Security module 114 could be combined or separated in any suitable configuration. For example, the activities of security module 114 could be shifted to network security module 122.

Figure 2:
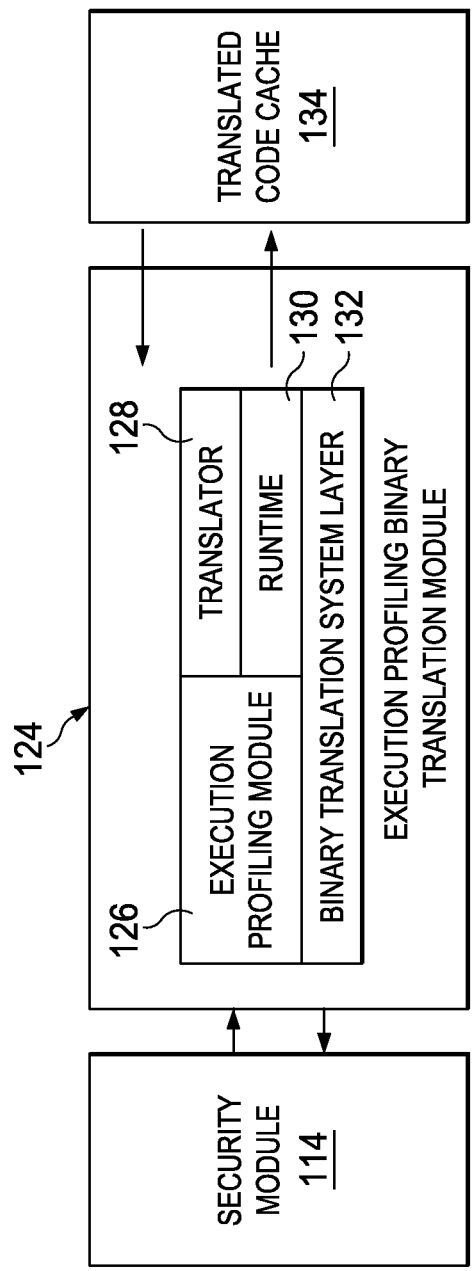
FIG. 2 is a simplified block diagram of a portion a communication system for the detection of shellcode, in accordance with an embodiment of the present disclosure.

Turning to FIG. 2, FIG. 2 is a simplified block diagram of example details of a communication system for the detection of shellcode, in accordance with an embodiment of the present disclosure. As illustrated in FIG. 2, execution profiling binary translation module 124 can include an execution profiling module 126, a translator 128, runtime 130, and a binary translation system layer 132. Execution profiling binary translation module 124 can be in communication with security module 114 and translated code cache 134. Execution profiling binary translation module 124 can be configured to run within a target application process space along with security module 114 and can be loaded dynamically by security module 114 to enable dynamic behavioral monitoring of the execution of an application.

Execution profiling module 126 can be configured to communicate with security module 114 and expose execution application program interfaces (APIs). Translator 128 can be configured to provide binary analysis, translation, optimization and other similar activities related to an application or code. Runtime 130 can be configured to provide translation cache management, lookup table management, system management controller (SMC) handling, etc. Binary translation system layer 132 can be configured to provide virtualize operating system interfaces such as system calls, exceptions, asynchronous callbacks, process and thread creations, etc.

Figure 3:
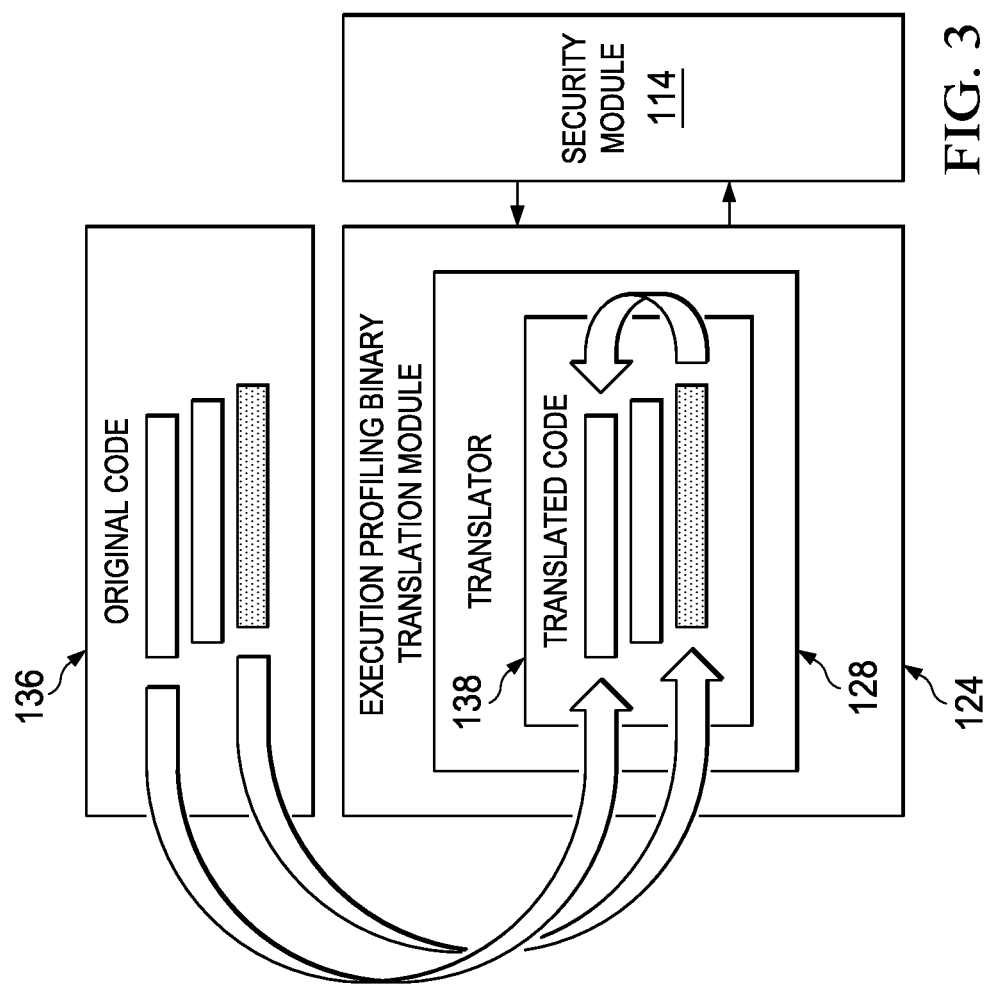
FIG. 3 is a simplified block diagram of example details of a communication system for the detection of shellcode, in accordance with an embodiment of the present disclosure.

Turning to FIG. 3, FIG. 3 is a simplified block diagram of example details of a communication system for the detection of shellcode, in accordance with an embodiment of the present disclosure. As illustrated in FIG. 3, original code 136 from an application can be sent to translator 128. Translator 128 can translate portions of original code 136 and store the translated portions in translated code cache 134. The translated code in translated code cache 134 can be analyzed by security module 114 for the presence of malicious or suspicious activity.

Execution profiling binary translation module 124 can be injected as a dll to a target application or process and policies can be configured by security module 114. Execution profiling binary translation module 124 can be configured to create a translation cache and start translation (with policy checks and/or policy embedding) and JIT'ing to translation cache from the resuming point of the target application or process. A stopping point for the execution profiling life cycle (illustrated in FIG. 5) can be specified by security module 114. Using translator 128 and runtime 130, when execution profiling binary translation module 124 detects a policy violation, the application or code that triggered the violation can be communicated to security module 114 for further analysis.

Figure 4:
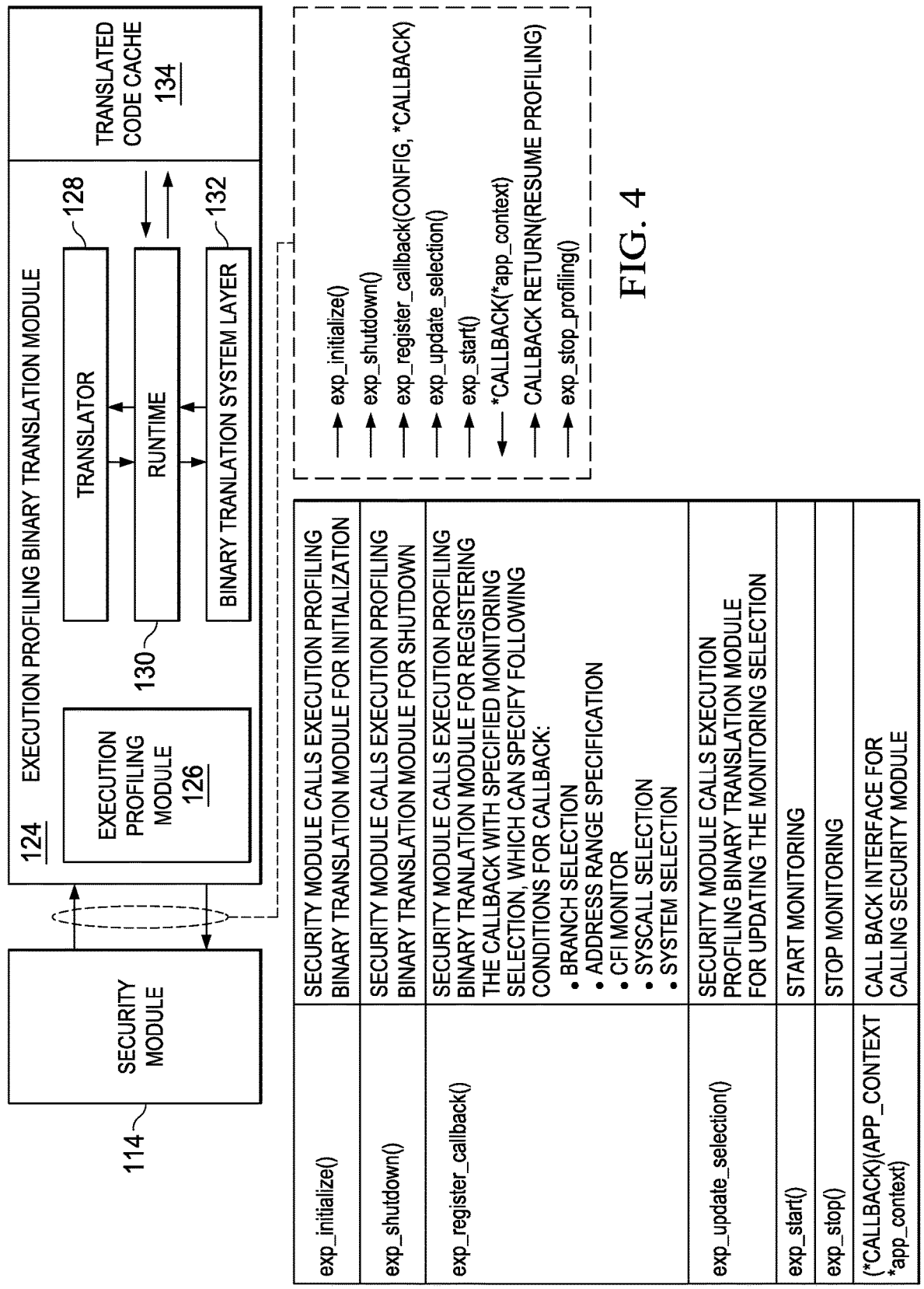
FIG. 4 is a simplified block diagram of example details of a communication system for the detection of shellcode, in accordance with an embodiment of the present disclosure.

Turning to FIG. 4, FIG. 4 is a simplified block diagram of example details of a communication system for the detection of shellcode, in accordance with an embodiment of the present disclosure. As illustrated in FIG. 4, security module 114 can initialize and shutdown execution profiling binary translation module 124. Security module 114 can also instruct execution profiling binary translation module 124 to start monitoring, set conditions for a callback, and to stop monitoring.

Figure 5:
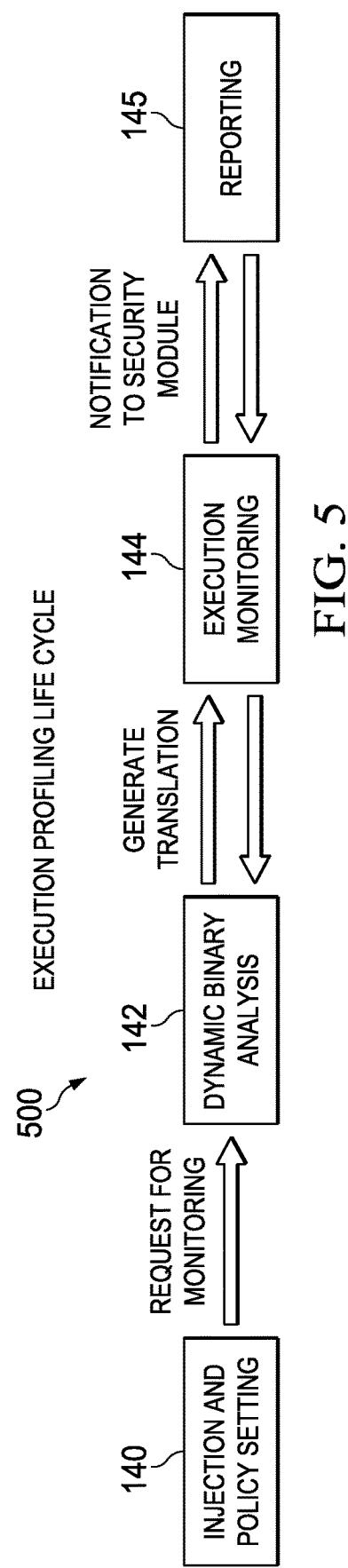
FIG. 5 is a simplified block diagram of example details of a communication system for the detection of shellcode, in accordance with an embodiment of the present disclosure.

Turning to FIG. 5, FIG. 5 is a simplified block diagram of example details of a communication system for the detection of shellcode, in accordance with an embodiment of the present disclosure. As illustrated in FIG. 5, an execution profiling life cycle 500 can include an injection and policy setting stage 140, a dynamic binary analysis stage 142, an execution monitoring stage 144, and a reporting stage 145. At injection and policy setting stage 140, security module 114 can be configured to determine a policy and monitor for particular applications. The profiling and monitoring can start upon a particular event or when an address or area of memory is accessed. Injection and policy setting stage 140 can execute for an entire process or at a thread level. From injection and policy setting stage 140, security module 114 can send a request for monitoring of an application to execution profiling binary translation module 124 and execution profiling life cycle 500 can enter dynamic binary analysis stage 142.

At dynamic binary analysis stage 142, execution profiling binary translation module 124 can be configured to analyze the original binary code before execution of the code and validate the code and address range of the code with a whitelist (e.g., whitelist 146). At dynamic binary analysis stage 142, execution profiling binary translation module 124 can also be configured to identify legitimate call, return, and jump targets for the code. Translator 128 can translate the code for execution monitoring stage 144.

At execution monitoring stage 144, execution profiling binary translation module 124 can be configured for branch monitoring and profiling, control flow integrity (e.g., call and return matching, etc.), monitoring specific or particular addresses and instruction, and application program interface policy usage. Suspicious activity or the activation of a preconfigured condition can cause execution profiling binary translation module 124 to send a notification to security module 114. For example, if the code is located in a writeable memory region, then the code should be analyzed for malware. Security module 114 can analyze the suspected or profiled data and take necessary action to prevent or mitigate malware.

Figure 6:
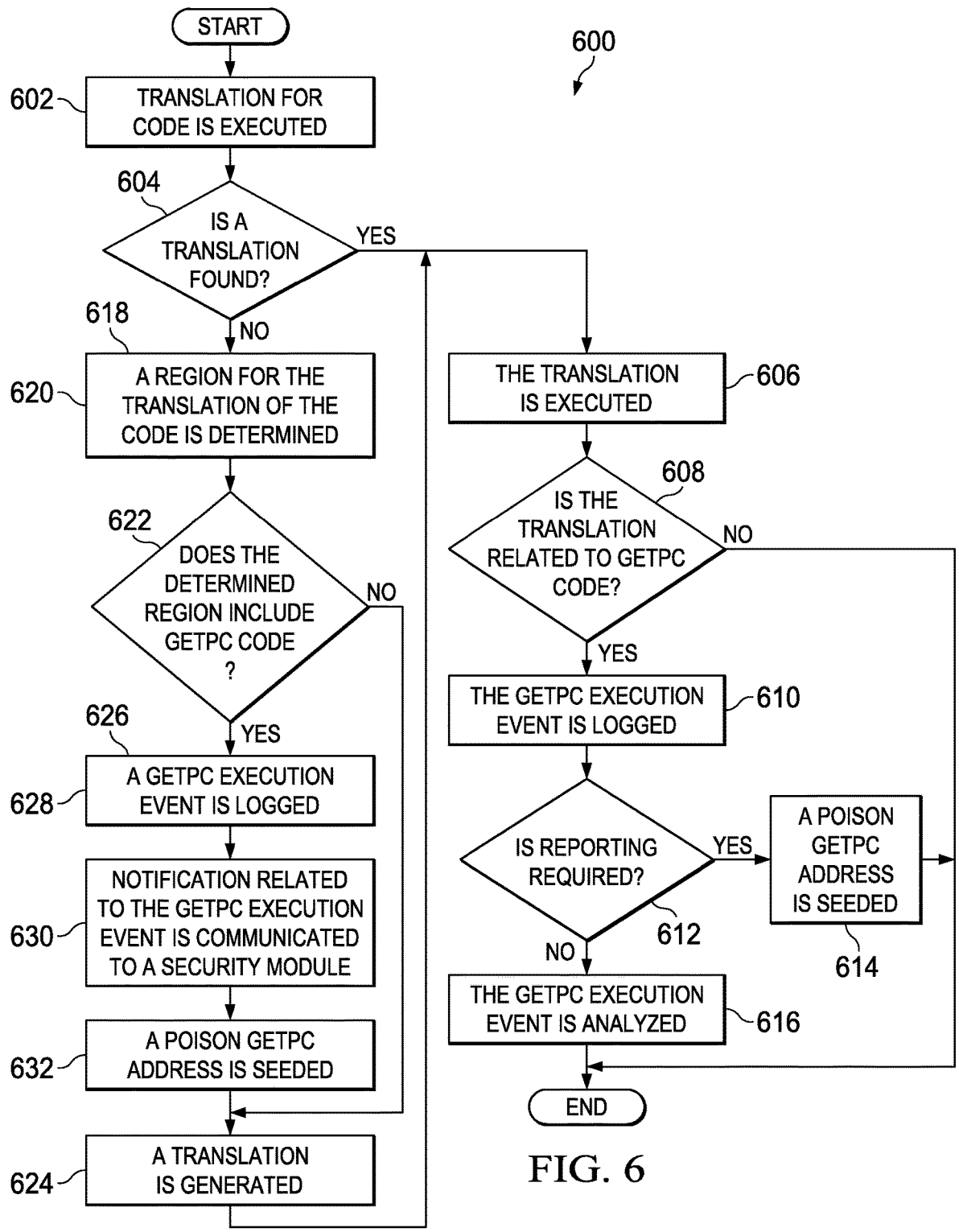
FIG. 6 is a simplified flowchart illustrating potential operations that may be associated with the communication system in accordance with an embodiment of the present disclosure.

Turning to FIG. 6, FIG. 6 is an example flowchart illustrating possible operations of a flow 600 that may be associated with detecting shellcode, in accordance with an embodiment. In an embodiment, one or more operations of flow 600 may be performed by security module 114 and execution profiling binary translation module 124. At 602, a translation for code is executed. At 604, the system determines if a translation is found. If a translation is found, then the translation is executed, as in 606. If a translation is not found, then a region (of memory) for the translation of the code is determined, as in 620. At 622, the system determines if the determined region of code includes GetPC code. If the determined region does include GetPC code, then a GetPC execution event is logged, as in 628. At 630, notification related to the GetPC execution event is communicated to a security module. At 632, a poison GetPC address is seeded. The poison GetPC address is seeded to cause a fault or trigger an alert when suspicious activity occurs. At 624, a translation is generated. Going back to 622, if the determined region does not include GetPC code, then a translation (for the code) is generated, as in 624. At 606, the translation is executed.

At 608, the system determines if the translation is related to GetPC code. If the translation is not related to GetPC code, then no further action is taken. If the translation is related to GetPC code, then the GetPC execution event is logged, as in 610. At 612, the system determines if reporting is required. If reporting is required then a poison GetPC address is seeded, as in 614. The poison GetPC address is seeded to cause a fault or trigger an alert when suspicious activity occurs and to cause a report to be generated. If reporting is not required, then the GetPC execution event is analyzed, as in 616. In an example, the GetPC execution event can be analyzed by security module 114 and/or network security module 122.

Figure 7:
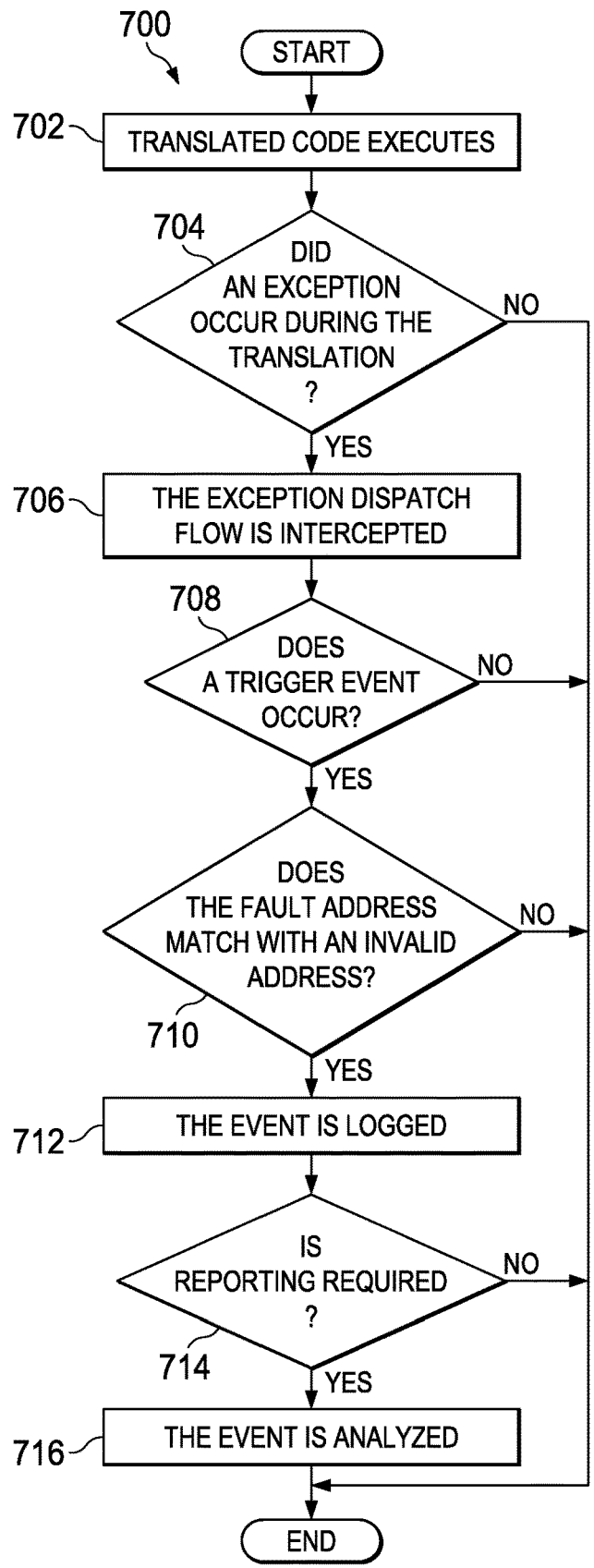
FIG. 7 is a simplified flowchart illustrating potential operations that may be associated with the communication system in accordance with an embodiment of the present disclosure.

Turning to FIG. 7, FIG. 7 is an example flowchart illustrating possible operations of a flow 700 that may be associated with detecting shellcode, in accordance with an embodiment. In an embodiment, one or more operations of flow 700 may be performed by security module 114 and execution profiling binary translation module 124. At 702, translated code executes. At 704, the system determines if an exception occurred during the translation. For example, a poison GetPC address may have been seeded to cause the exception. If an exception did not occur, then no further action is taken. If an exception did occur, then the exception dispatch flow is intercepted, as in 706. At 708, the system determines if a trigger event occurred. For example, the trigger event may be an exception memory fault (e.g., a memory fault translation, memory fault caused by a poisoned address) or some other predetermined event to signal or indicate suspicious behavior. If a trigger event did not occur, then no further action is taken. If a trigger event did occur, then the system determines if the fault address matches with an invalid address, as in 710. If the fault address does not match with an invalid address, then no further action is taken. If the fault address does match with an invalid address, then the event is logged, as in 712. At 714, the system determines if reporting is required. If reporting is not required, then no further action is taken. If reporting is required, then the event can be analyzed, as in 714. In an example, the event can be analyzed by security module 114 and/or network security module 122.

Figure 8:
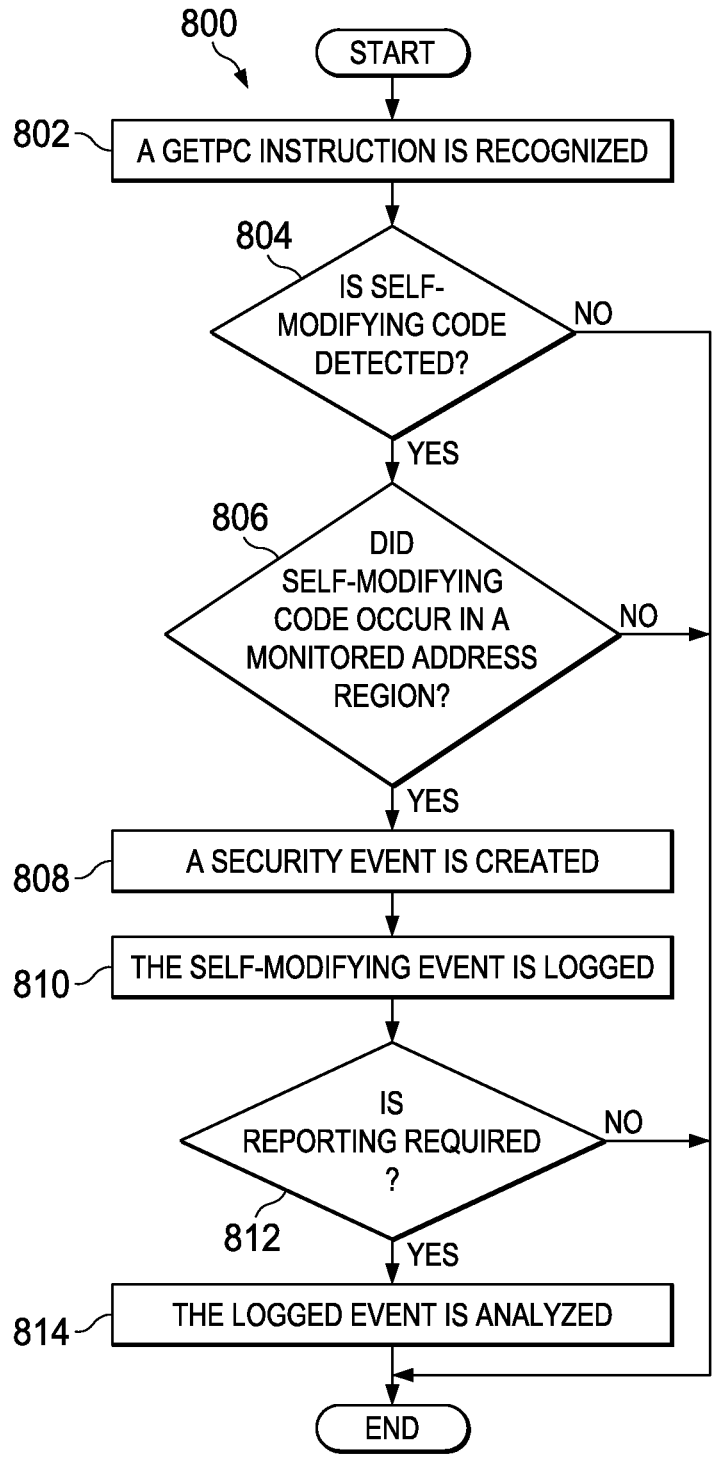
FIG. 8 is a simplified flowchart illustrating potential operations that may be associated with the communication system in accordance with an embodiment of the present disclosure.

Turning to FIG. 8, FIG. 8 is an example flowchart illustrating possible operations of a flow 800 that may be associated with detecting shellcode, in accordance with an embodiment. In an embodiment, one or more operations of flow 800 may be performed by security module 114 and execution profiling binary translation module 124. At 802, a GetPC instruction is recognized. At 804, the system determines if self-modifying code is detected. If self-modifying code was not detected, then no further action is taken. If self-modifying code was detected, then the system determines if the self-modifying code occurred in a monitored address region, as in 806. In an example, the monitored address region is computed from the GetPC instruction recognized in 802 and a GetPC address obtained from the recognized GetPC instruction. If the self-modifying code did not occur in a monitored address region, then no further action is taken. If the self-modifying code did occur in a modified address region, then a security event is created, as in 808. At 810, the self-modifying event is logged. At 812, the system determines if reporting is required. If reporting is not required, then no further action is taken. If reporting is required, then the logged event can be analyzed, as in 814. In an example, the logged event can be analyzed by security module 114 and/or network security module 122.

Figure 9:
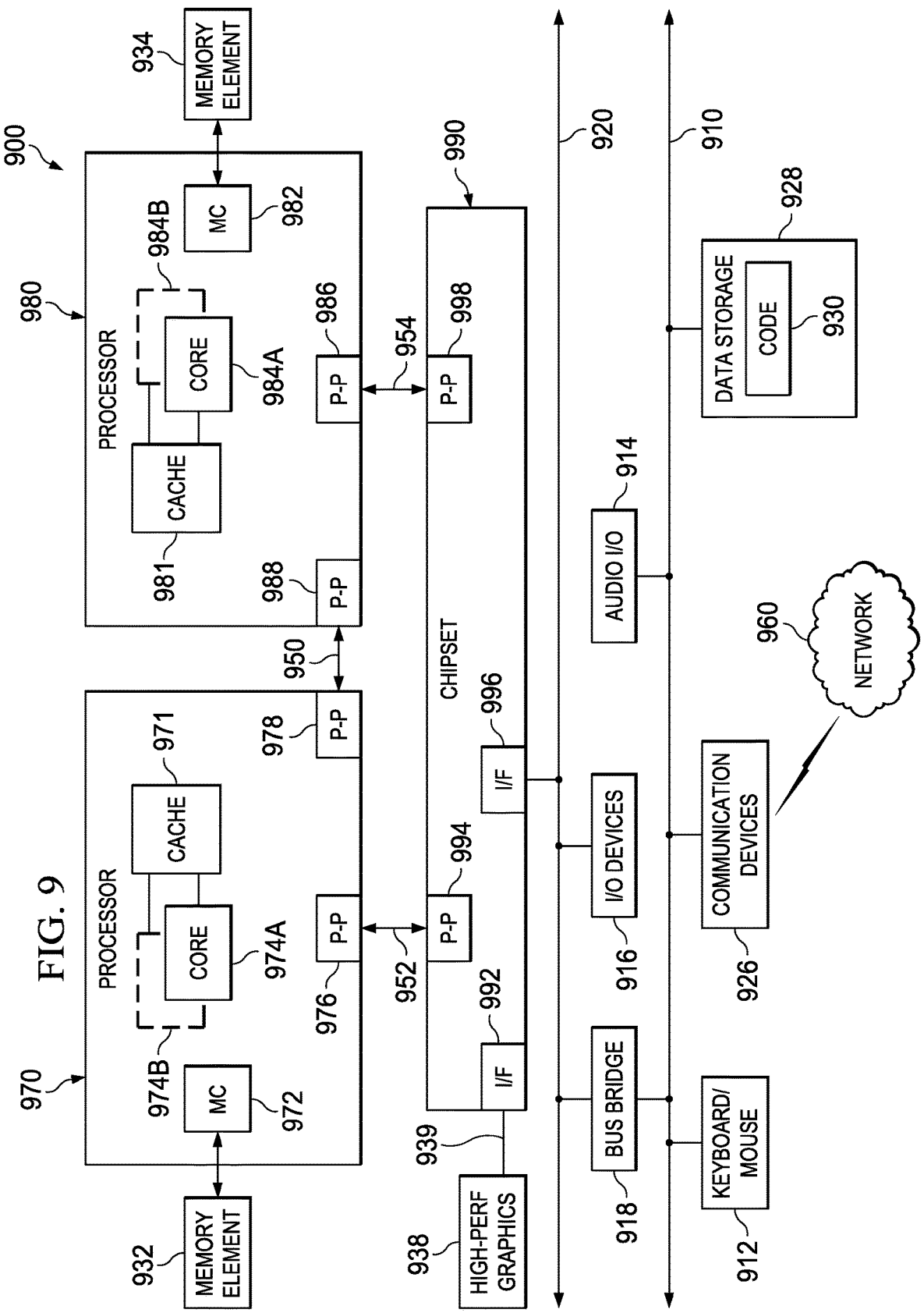
FIG. 9 is a block diagram illustrating an example computing system that is arranged in a point-to-point configuration in accordance with an embodiment.

FIG. 9 illustrates a computing system 900 that is arranged in a point-to-point (PtP) configuration according to an embodiment. In particular, FIG. 9 shows a system where processors, memory, and input/output devices are interconnected by a number of point-to-point interfaces. Generally, one or more of the network elements of communication system 100 may be configured in the same or similar manner as computing system 900.

As illustrated in FIG. 9, system 900 may include several processors, of which only two, processors 970 and 980, are shown for clarity. While two processors 970 and 980 are shown, it is to be understood that an embodiment of system 900 may also include only one such processor. Processors 970 and 980 may each include a set of cores (i.e., processor cores 974A and 974B and processor cores 984A and 984B) to execute multiple threads of a program. The cores may be configured to execute instruction code in a manner similar to that discussed above with reference to FIGS. 6-9. Each processor 970, 980 may include at least one shared cache 971, 981. Shared caches 971, 981 may store data (e.g., instructions) that are utilized by one or more components of processors 970, 980, such as processor cores 974 and 984.

Processors 970 and 980 may also each include integrated memory controller logic (MC) 972 and 982 to communicate with memory elements 932 and 934. Memory elements 932 and/or 934 may store various data used by processors 970 and 980. In alternative embodiments, memory controller logic 972 and 982 may be discrete logic separate from processors 970 and 980.

Processors 970 and 980 may be any type of processor and may exchange data via a point-to-point (PtP) interface 950 using point-to-point interface circuits 978 and 988, respectively. Processors 970 and 980 may each exchange data with a chipset 990 via individual point-to-point interfaces 952 and 954 using point-to-point interface circuits 976, 986, 994, and 998. Chipset 990 may also exchange data with a high-performance graphics circuit 938 via a high-performance graphics interface 939, using an interface circuit 992, which could be a PtP interface circuit. In alternative embodiments, any or all of the PtP links illustrated in FIG. 9 could be implemented as a multi-drop bus rather than a PtP link.

Chipset 990 may be in communication with a bus 920 via an interface circuit 996. Bus 920 may have one or more devices that communicate over it, such as a bus bridge 918 and I/O devices 916. Via a bus 910, bus bridge 918 may be in communication with other devices such as a keyboard/mouse 912 (or other input devices such as a touch screen, trackball, etc.), communication devices 926 (such as modems, network interface devices, or other types of communication devices that may communicate through a computer network 960), audio I/O devices 914, and/or a data storage device 928. Data storage device 928 may store code 930, which may be executed by processors 970 and/or 980. In alternative embodiments, any portions of the bus architectures could be implemented with one or more PtP links.

The computer system depicted in FIG. 9 is a schematic illustration of an embodiment of a computing system that may be utilized to implement various embodiments discussed herein. It will be appreciated that various components of the system depicted in FIG. 9 may be combined in a system-on-a-chip (SoC) architecture or in any other suitable configuration. For example, embodiments disclosed herein can be incorporated into systems including mobile devices such as smart cellular telephones, tablet computers, personal digital assistants, portable gaming devices, etc. It will be appreciated that these mobile devices may be provided with SoC architectures in at least some embodiments.

Figure 10:
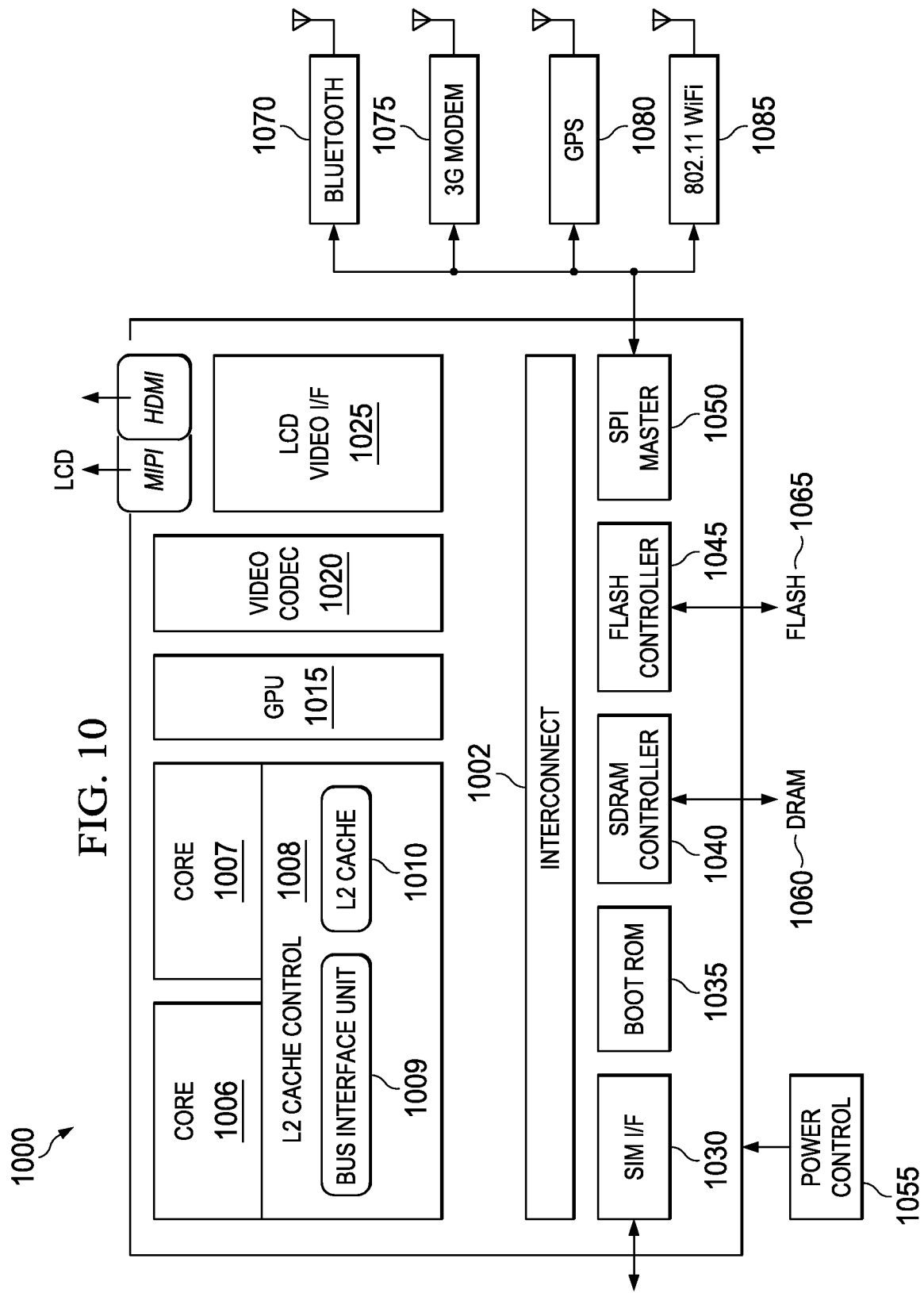
FIG. 10 is a simplified block diagram associated with an example ARM ecosystem system on chip (SOC) of the present disclosure.

Turning to FIG. 10, FIG. 10 is a simplified block diagram associated with an example ARM ecosystem SOC 1000 of the present disclosure. At least one example implementation of the present disclosure can include the shellcode detection features discussed herein and an ARM component. For example, the example of FIG. 10 can be associated with any ARM core (e.g., A-9, A-15, etc.). Further, the architecture can be part of any type of tablet, smartphone (inclusive of Android™ phones, iPhones™, iPad™ Google Nexus™, Microsoft Surface™, personal computer, server, video processing components, laptop computer (inclusive of any type of notebook), Ultrabook™ system, any type of touch-enabled input device, etc.

In this example of FIG. 10, ARM ecosystem SOC 1000 may include multiple cores 1006-1007, an L2 cache control 1008, a bus interface unit 1009, an L2 cache 1010, a graphics processing unit (GPU) 1015, an interconnect 1002, a video codec 1020, and a liquid crystal display (LCD) I/F 1025, which may be associated with mobile industry processor interface (MIPI)/high-definition multimedia interface (HDMI) links that couple to an LCD.

ARM ecosystem SOC 1000 may also include a subscriber identity module (SIM) I/F 1030, a boot read-only memory (ROM) 1035, a synchronous dynamic random access memory (SDRAM) controller 1040, a flash controller 1045, a serial peripheral interface (SPI) master 1050, a suitable power control 1055, a dynamic RAM (DRAM) 1060, and flash 1065. In addition, one or more example embodiment include one or more communication capabilities, interfaces, and features such as instances of Bluetooth™ 1070, a 3G modem 1075, a global positioning system (GPS) 1080, and an 802.11 Wi-Fi 1085.

In operation, the example of FIG. 10 can offer processing capabilities, along with relatively low power consumption to enable computing of various types (e.g., mobile computing, high-end digital home, servers, wireless infrastructure, etc.). In addition, such an architecture can enable any number of software applications (e.g., Android™, Adobe™ Flash™ Player, Java Platform Standard Edition (Java SE), JavaFX, Linux, Microsoft Windows Embedded, Symbian and Ubuntu, etc.). In at least one example embodiment, the core processor may implement an out-of-order superscalar pipeline with a coupled low-latency level-2 cache.

Figure 11:
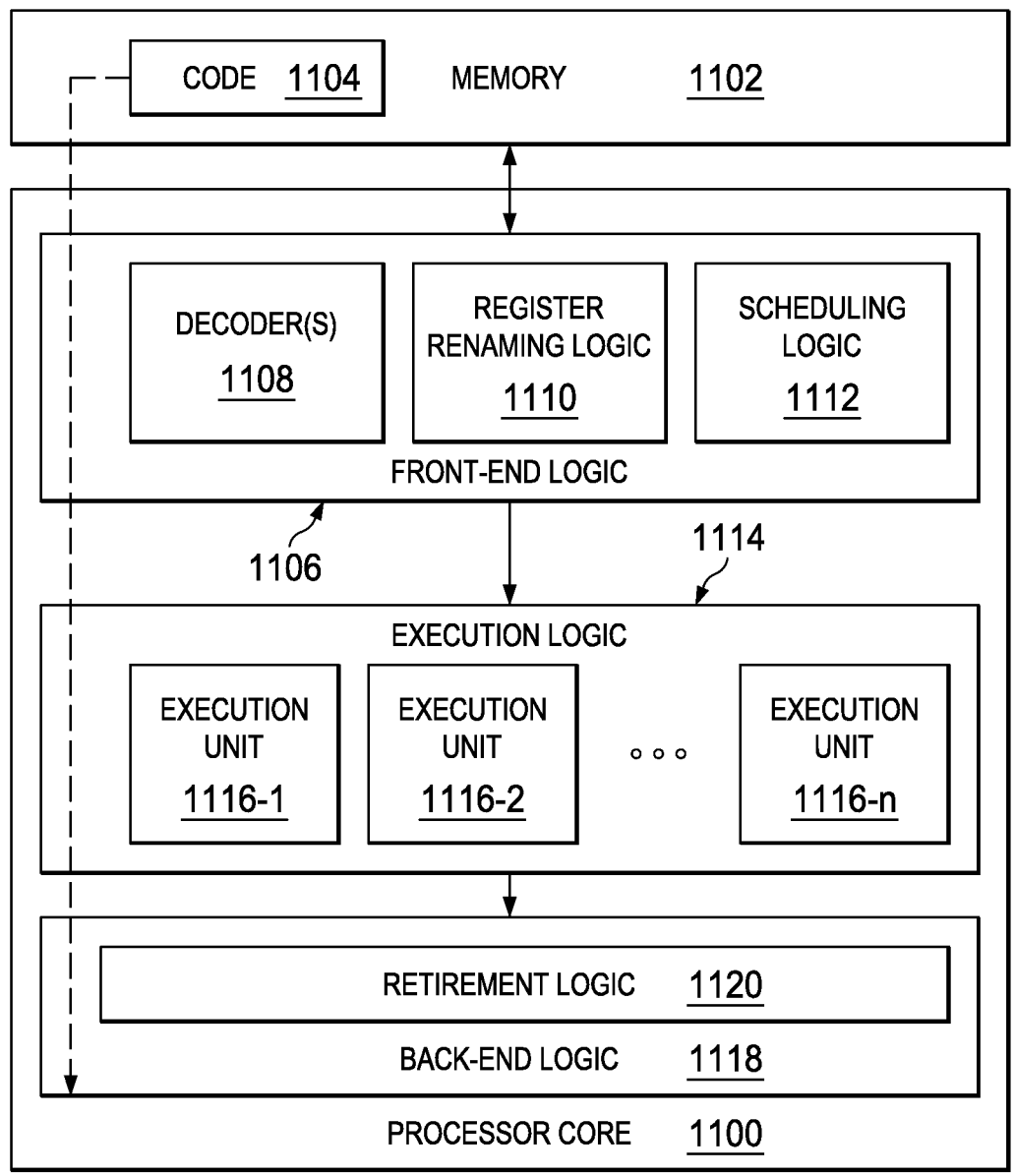
FIG. 11 is a block diagram illustrating an example processor core in accordance with an embodiment.

FIG. 11 illustrates a processor core 1100 according to an embodiment. Processor core 1100 may be the core for any type of processor, such as a micro-processor, an embedded processor, a digital signal processor (DSP), a network processor, or other device to execute code. Although only one processor core 1100 is illustrated in FIG. 11, a processor may alternatively include more than one of the processor core 1100 illustrated in FIG. 11. For example, processor core 1100 represents one example embodiment of processors cores 974a, 974b, 984a, and 984b shown and described with reference to processors 970 and 980 of FIG. 9. Processor core 1100 may be a single-threaded core or, for at least one embodiment, processor core 1100 may be multithreaded in that it may include more than one hardware thread context (or "logical processor") per core.

FIG. 11 also illustrates a memory 1102 coupled to processor core 1100 in accordance with an embodiment. Memory 1102 may be any of a wide variety of memories (including various layers of memory hierarchy) as are known or otherwise available to those of skill in the art. Memory 1102 may include code 1104, which may be one or more instructions, to be executed by processor core 1100. Processor core 1100 can follow a program sequence of instructions indicated by code 1104. Each instruction enters a front-end logic 1106 and is processed by one or more decoders 1108. The decoder may generate, as its output, a micro operation such as a fixed width micro operation in a predefined format, or may generate other instructions, microinstructions, or control signals that reflect the original code instruction. Front-end logic 1106 also includes register renaming logic 1110 and scheduling logic 1112, which generally allocate resources and queue the operation corresponding to the instruction for execution.

Processor core 1100 can also include execution logic 1114 having a set of execution units 1116-1 through 1116-N. Some embodiments may include a number of execution units dedicated to specific functions or sets of functions. Other embodiments may include only one execution unit or one execution unit that can perform a particular function. Execution logic 1114 performs the operations specified by code instructions.

After completion of execution of the operations specified by the code instructions, back-end logic 1118 can retire the instructions of code 1104. In one embodiment, processor core 1100 allows out of order execution but requires in order retirement of instructions. Retirement logic 1120 may take a variety of known forms (e.g., re-order buffers or the like). In this manner, processor core 1100 is transformed during execution of code 1104, at least in terms of the output generated by the decoder, hardware registers and tables utilized by register renaming logic 1110, and any registers (not shown) modified by execution logic 1114.

Although not illustrated in FIG. 11, a processor may include other elements on a chip with processor core 1100, at least some of which were shown and described herein with reference to FIG. 10. For example, as shown in FIG. 10, a processor may include memory control logic along with processor core 1100. The processor may include I/O control logic and/or may include I/O control logic integrated with memory control logic.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that communication system 100 and their teachings are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the operations in the preceding flow diagrams (i.e., FIGS. 6-8) illustrate only some of the possible correlating scenarios and patterns that may be executed by, or within, communication system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although communication system 100 have been illustrated with reference to particular elements and operations that facilitate the communication process, these elements and operations may be replaced by any suitable architecture, protocols, and/or processes that achieve the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

Example C1 is at least one machine readable medium having one or more instructions that when executed by at least one processor, cause the at least one machine readable medium to monitor code as it executes, wherein the code includes self-modifying code and log the event if the self-modifying code occurred in a GetPC address region.

In Example C2, the subject matter of Example C1 can optionally include one or more instructions that when executed by the least one processor, cause the at least one machine readable medium to analyze the code for malware.

In Example C3, the subject matter of any one of Examples C1-C2 can optionally include one or more instructions that when executed by the least one processor, cause the at least one machine readable medium to seed a poison GetPC address in the GetPC address region.

In Example C4, the subject matter of any one of Examples C1-C3 can optionally include where the poison GetPC address causes a memory fault.

In Example C5, the subject matter of any one of Examples C1-C4 can optionally include one or more instructions that when executed by the least one processor, cause the at least one machine readable medium to log the event if it is determine that a memory fault exception occurred during translation and the memory fault translation matches with an invalid address.

In Example C6, the subject matter of any one of Example C1-05 can optionally include one or more instructions that when executed by the least one processor, cause the at least one machine readable medium to communicate the code to a security module if the self-modifying code occurred in a GetPC address region.

In Example C7, the subject matter of any one of Examples C1-C6 can optionally include one or more instructions that when executed by the least one processor, cause the at least one machine readable medium to determine if an exception occurred during translation of the code and log the event if the exception occurred at an invalid address.

In Example C8, the subject matter of any one of Examples C1-C7 can optionally include one or more instructions that when executed by the least one processor, cause the at least one machine readable medium to communicate the code to a security module if the code is in a writeable memory region.

In Example A1, an electronic device can include an execution profiling binary translation module, where the execution profiling binary translation module is configured to monitor code as it executes, wherein the code includes self-modifying code and log the event if the self-modifying code occurred in a GetPC address region.

In Example, A2, the subject matter of Example A1 can optionally include a security module configured to analyze the code for malware.

In Example A3, the subject matter of any one of Examples A1-A2 can optionally include where the execution profiling binary translation module is further configured to seed a poison GetPC address in the GetPC address region.

In Example A4, the subject matter of any one of Examples A1-A3 can optionally include where the poison GetPC address causes a memory fault.

In Example A5, the subject matter of any one of Examples A1-A4 can optionally include where the execution profiling binary translation module is further configured to log the event if it is determine that a memory fault exception occurred during a translation of the code and the memory fault translation matches with an invalid address.

In Example A6, the subject matter of any one of Examples A1-A5 can optionally include where the execution profiling binary translation module is further configured to communicate the code to a security module if the self-modifying code occurred in a GetPC address region.

In Example A7, the subject matter of any one of Examples A1-A6 can optionally include where the execution profiling binary translation module is further configured to determine if an exception occurred during the translation and log the event if the exception occurred at an invalid address.

In Example A8, the subject matter of any one of Examples A1-A7 can optionally include where the execution profiling binary translation module is further configured to communicate the code to a security module if the code is in a writeable memory region.

Example M1 is a method including monitoring code as it executes, wherein the code includes self-modifying code and logging the event if the self-modifying code occurred in a GetPC address region.

In Example M2, the subject matter of Example M1 can optionally include analyzing the code for malware.

In Example M3, the subject matter of any one of the Examples M1-M2 can optionally include seeding a poison GetPC address in the GetPC address region.

In Example M4, the subject matter of any one of the Examples M1-M3 can optionally include where the poison GetPC address causes a memory fault.

In Example M5, the subject matter of any one of the Examples M1-M4 can optionally include logging the event if it is determine that a memory fault exception occurred during a translation of the code and the memory fault translation matches with an invalid address.

In Example M6, the subject matter of any one of the Examples M1-M5 can optionally include communicating the code to a security module if the self-modifying code occurred in a GetPC address region.

In Example M7, the subject matter of any one of the Examples M1-M6 can optionally include determining if an exception occurred during the translation and logging the event if the exception occurred at an invalid address.

Example S1 is a system for detecting shellcode, the system including an execution profiling binary translation module configured for monitoring code as it executes, wherein the code includes self-modifying code and logging the event if the self-modifying code occurred in a GetPC address region.

In Example S2, the subject matter of Example S1 can optionally include where the execution profiling binary translation module is further configured for seeding a poison GetPC address in the GetPC address region.

Example SS1 is a system for detecting shellcode, the system including an execution profiling binary translation module configured to monitor code as it executes, wherein the code includes self-modifying code and log the event if the self-modifying code occurred in a GetPC address region.

In Example SS2, the subject matter of Example S1 can optionally include where the execution profiling binary translation module is further configured to analyze the code for malware.

In Example SS3, the subject matter of any one of Examples SS1-SS2 can optionally include where the execution profiling binary translation module is further configured to seed a poison GetPC address in the GetPC address region.

In Example SS4, the subject matter of any one of Examples SS1-SS3 can optionally include where the poison GetPC address causes a memory fault.

In Example SS5, the subject matter of any one of Examples SS1-SS3 can optionally include where the execution profiling binary translation module is further configured to log the event if it is determine that a memory fault exception occurred during a translation of the code and the memory fault translation matches with an invalid address.

Example SS6, the subject matter of any one of Examples SS1-SS6 can optionally include where the execution profiling binary translation module is further configured to communicate the code to a security module if the self-modifying code occurred in a GetPC address region.

Example SS7, the subject matter of any one of Examples SS1-SS6 can optionally include where the execution profiling binary translation module is further configured to determine if an exception occurred during the translation and log the event if the exception occurred at an invalid address.

Example SS8, the subject matter of any one of Examples SS1-SS7 can optionally include where the execution profiling binary translation module is further configured to communicate the code to a security module if the code is in a writeable memory region.

Example X1 is a machine-readable storage medium including machine-readable instructions to implement a method or realize an apparatus as in any one of the Examples A1-A8, or M1-M7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. At least one non-transitory machine readable medium comprising one or more instructions that when executed by at least one processor, cause the at least one processor to:
   detect execution of a GetPC instruction sequence;
   in response to detecting the execution of the GetPC instruction sequence, return to the GetPC instruction sequence a poison GetPC address in a GetPC address region instead of a current PC address, wherein the poison GetPC address is an identifiable invalid address;
   determine whether self-modifying code is detected;
   monitor, based on a determination that self-modifying code is detected, code as it executes to detect whether execution of the self-modifying code occurred at the poison GetPC address in the GetPC address region; and
   based on a determination that the execution of the self-modifying code occurred at the poison GetPC address in the GetPC address region:
   log an event; and
   analyze the code for malware.

2. The at least one machine readable medium of claim 1, wherein the poison GetPC address causes a memory fault.

3. The at least one machine readable medium of claim 1, further comprising one or more instructions that when executed by at least one processor, further cause the at least one processor to:
   log the event based on a determination that a memory fault exception occurred during translation and the memory fault translation matches with the identifiable invalid address.

4. The at least one machine readable medium of claim 1, further comprising one or more instructions that when executed by at least one processor, further cause the at least one processor to:
   communicate the code to a security module based on a determination that the self-modifying code occurred at the poison GetPC address in the GetPC address region.

5. The at least one machine readable medium of claim 1, further comprising one or more instructions that when executed by at least one processor, further cause the at least one processor to:
   determine whether an exception occurred during a translation of the code; and
   log the event based on a determination that the exception occurred at the identifiable invalid address.

6. The at least one machine readable medium of claim 1, further comprising one or more instructions that when executed by at least one processor, further cause the at least one processor to:
   communicate the code to a security module based on a determination that the code is in a writeable memory region.

7. An apparatus comprising:
   a processor coupled to a memory; and
   the memory storing executable instructions that when executed by the processor cause the processor to:
   detect execution of a GetPC instruction sequence;
   in response to detecting the execution of the GetPC instruction sequence, return to the Get PC instruction sequence a poison GetPC address in a GetPC address region on the memory instead of a current PC address, wherein the poison GetPC address is an identifiable invalid address;
   determine whether self-modifying code is detected;
   monitor, based on a determination that self-modifying code is detected, code as it executes to detect whether execution of the self-modifying code occurred at the poison GetPC address in the GetPC address region; and
   based on a determination that the execution of the self-modifying code occurred at the poison GetPC address in the GetPC address region of the memory:
   log an event; and
   analyze the code for malware.

8. The apparatus of claim 7, wherein the poison GetPC address causes a memory fault.

9. The apparatus of claim 7, wherein the executable instructions that when executed by the processor further cause the processor to:
   log the event based on a determination that a memory fault exception occurred during translation and the memory fault translation matches with the identifiable invalid address.

10. The apparatus of claim 7, wherein the executable instructions that when executed by the processor further cause the processor to:
    communicate the code to a security module based on a determination that the self-modifying code occurred at the poison GetPC address in the GetPC address region.

11. The apparatus of claim 7, wherein the executable instructions that when executed by the processor further cause the processor to:
   determine whether an exception occurred during a translation of the code; and
   log an event based on a determination that the exception occurred at the identifiable invalid address.

12. The apparatus of claim 7, wherein the executable instructions that when executed by the processor further cause the processor to:
   communicate the code to a security module based on a determination that the code is in a writeable memory region.

13. A method comprising:
   detecting execution of a GetPC instruction sequence;
   in response to detecting the execution of the GetPC instruction sequence, returning to the GetPC instruction sequence a poison GetPC address in a GetPC address region instead of a current PC address, wherein the poison GetPC address is an identifiable invalid address;
   determining whether self-modifying code is detected;
   monitoring, based on a determination that self-modifying code is detected, code as it executes to detect whether execution of the self-modifying code occurred at the poison GetPC address in the GetPC address region; and
   based on a determination that the execution of the self-modifying code occurred at the poison GetPC address in the GetPC address region:
   logging an event; and
   analyzing the code for malware.

14. The method of claim 13, wherein the poison GetPC address causes a memory fault.

15. The method of claim 13, further comprising:
   logging the event based on a determination that a memory fault exception occurred during translation and the memory fault translation matches with the identifiable invalid address.

16. The method of claim 13, further comprising:
   communicating the code to a security module based on a determination that the self-modifying code occurred at the poison GetPC address in the GetPC address region.

17. The method of claim 13, further comprising:
   determining whether an exception occurred during a translation of the code; and
   logging the event based on a determination that the exception occurred at the identifiable invalid address.

18. The at least one machine readable medium of claim 1, wherein the self-modifying code includes a self-decrypting code sequence.

19. The apparatus of claim 7, wherein the self-modifying code includes a self-decrypting code sequence.

20. The method of claim 13, wherein the self-modifying code includes a self-decrypting code sequence.

* * * * *